(12) United States Patent
Halet

(10) Patent No.: US 11,227,171 B2
(45) Date of Patent: Jan. 18, 2022

(54) DETECTION SYSTEM, DETECTION DEVICE AND METHOD THEREFOR

(71) Applicant: SITA Advanced Travel Solutions Limited, Hampshire (GB)

(72) Inventor: Christian Halet, Brussels (BE)

(73) Assignee: SITA Advanced Travel Solutions Limited, Hampshire (GB)

(*) Notice: Subject to any disclaimer, the term of this patent is extended or adjusted under 35 U.S.C. 154(b) by 95 days.

(21) Appl. No.: 16/606,441

(22) PCT Filed: Apr. 20, 2018

(86) PCT No.: PCT/EP2018/060242
§ 371 (c)(1),
(2) Date: Oct. 18, 2019

(87) PCT Pub. No.: WO2018/193123
PCT Pub. Date: Oct. 25, 2018

(65) Prior Publication Data
US 2021/0117709 A1 Apr. 22, 2021

(30) Foreign Application Priority Data

Apr. 21, 2017 (GB) .................... 1706351

(51) Int. Cl.
*G06K 9/00* (2006.01)
*G06K 9/46* (2006.01)

(52) U.S. Cl.
CPC ..... *G06K 9/00906* (2013.01); *G06K 9/00228* (2013.01); *G06K 9/46* (2013.01)

(58) Field of Classification Search
None
See application file for complete search history.

(56) References Cited

U.S. PATENT DOCUMENTS 8,050,465 B2 * 11/2011 Ianculescu ........... G06K 9/6257
382/118
2007/0183663 A1 8/2007 Wang et al.
(Continued)

FOREIGN PATENT DOCUMENTS

WO 2016077590 A2 5/2016

OTHER PUBLICATIONS

Yan et al, "Face liveness detection by exploring multiple scenic clues", Dec. 2012, IEEE, pp. 188-193 (Year: 2012).*
(Continued)

*Primary Examiner* — Edward Park
(74) *Attorney, Agent, or Firm* — Morris, Manning & Martin, LLP; Daniel E. Sineway; Adam J. Thompson

(57) ABSTRACT

An image processing device is provided. The device comprises processing means configured to determine a first zone from an image associated with the user wherein the first zone is associated with one or more features characterising the user and wherein the first zone is associated with a first set of sample values; determine a second zone from a further image associated with the user wherein the second zone is associated with a second set of sample values wherein a
(Continued)

location of at least some of the second set of sample values are different from a location of the first set of sample values; and determine a characteristic value from the second zone based on sample values associated with the second zone.

25 Claims, 10 Drawing Sheets

(56) References Cited

U.S. PATENT DOCUMENTS

| | | | | |
|---|---|---|---|---|
| 2007/0248268 | A1* | 10/2007 | Wood | G06K 9/00134 |
| | | | | 382/195 |
| 2009/0041347 | A1 | 2/2009 | Iguchi et al. | |
| 2010/0189325 | A1* | 7/2010 | Garg | G06K 9/4604 |
| | | | | 382/131 |
| 2011/0050939 | A1* | 3/2011 | Tsurumi | H04N 5/232 |
| | | | | 348/222.1 |
| 2011/0181746 | A1 | 7/2011 | Free et al. | |
| 2017/0053174 | A1 | 2/2017 | Fan et al. | |
| 2018/0244503 | A1* | 8/2018 | Fuchs | B66B 25/00 |
| 2018/0260668 | A1* | 9/2018 | Shen | G06N 3/084 |
| 2018/0373859 | A1* | 12/2018 | Ganong | G06F 21/32 |

OTHER PUBLICATIONS

International Search Report and Written Opinion issued in International Application No. PCT/EP2018/060242, dated Feb. 8, 2018 (2 pages).

Stauffer C et al: "Adaptive background mixture models for real-time tracking", Proceedings of the 1999 IEEE Computer Society Conference on Computer Vision and Pattern Recognition, Jun. 23-25, 1999; Fort Collins, Colorado, IEEE, The Institute of Electrical and Electronics Engineers, Inc, US, vol. 2, Jun. 23, 1999 (Jun. 23, 1999), pp. 246-252, XP010347611.

Andre Anjos et al: "Counter-measures to photo attacks in face recognition: A public database and a baseline", Biometrics (IJCB), 2011 International Joint Conference on, IEEE, Oct. 11, 2011 (Oct. 11, 2011), pp. 1-7, XP032081569.

Junjie Yan et al: "Face liveness detection by exploring multiple scenic clues", 2012 12th International Conference on Control Automation Robotics & Vision (I CARCV), IEEE, Dec. 5, 2012 (Dec. 5, 2012), pp. 188-193, XP032347138.

Search Report issued in GB Application No. 1706351.2, dated Oct. 17, 2017 (5 pages).

* cited by examiner

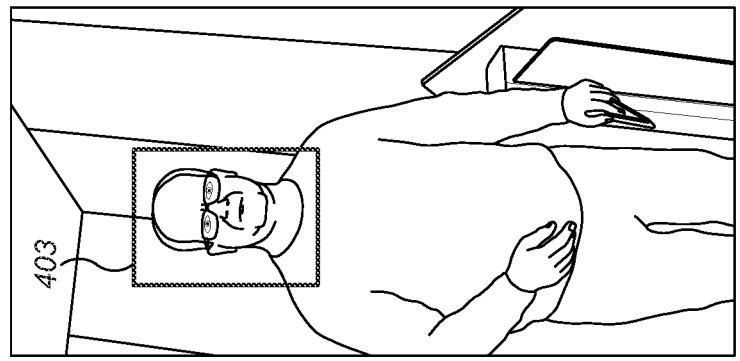
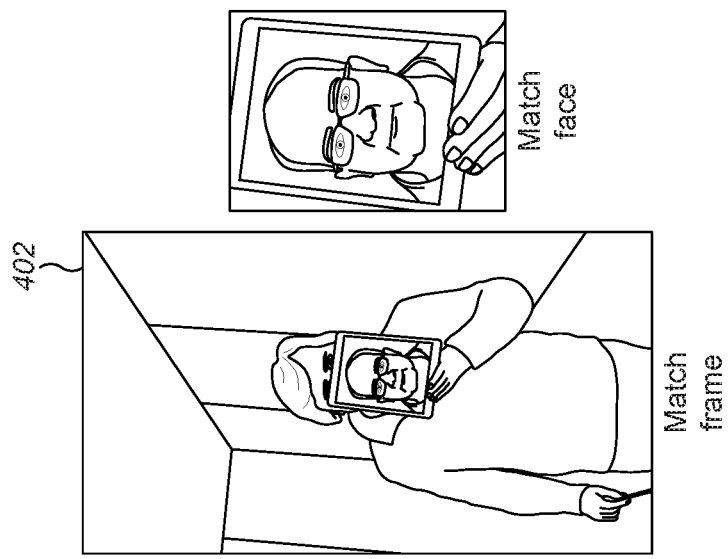
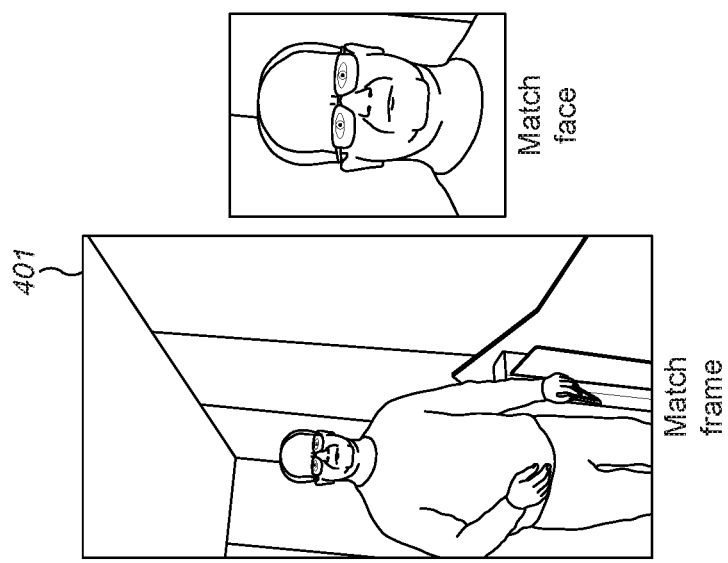
FIG. 4

DETECTION SYSTEM, DETECTION DEVICE AND METHOD THEREFOR

CROSS-REFERENCE TO RELATED APPLICATIONS

This application is a national stage application, filed under 35 U.S.C. § 371, of International Patent Application No. PCT/EP2018/060242, filed on Apr. 20, 2018, which claims the benefit of and priority of Great Britain Application No. GB 1706351.2, filed Apr. 21, 2017, and entitled "DETECTION SYSTEM, DETECTION DEVICE AND METHOD THEREFOR," which are incorporated by reference herein in their entirety.

FIELD OF THE INVENTION

This invention relates in general to an image processing system. More particularly, this invention relates to a system, apparatus, method or computer program for detecting an individual such as a customer or passenger, or a device for use by an agent. More particularly, the invention relates to a system for detecting a passenger which may be used by a security agent, an airline agent, or other agent at an airport or other transportation hub such as a railway station, or bus station.

BACKGROUND OF THE INVENTION

Facial recognition and face matching are widely used biometric identification systems which reduce the need for human assessment during the identification process. Compared to other biometric identification systems, such as retina or fingerprint scanning, facial recognition is simple, user-friendly and convenient. However, such known facial recognition systems are susceptible to being deceived by 'spoofing' attacks where a person tricks the system into recognising a different face. This may be achieved for example by using a printed image or mask to show a different face. To counter this, face matching and recognition systems typically use liveness detection measures to assess whether a matched face is 'live' or 'non-live' using indicators such as the face's motion, texture and life signs. However, such systems have numerous drawbacks as discussed below.

One liveness detection measure is motion analysis which assesses how certain features of a face move in relation to each other. When a 3D face is rendered in 2D, central features of the face such as the nose move much more than outer features of the face due to perspective. By contrast, there is no relative movement between the features of a 2D face.

However, systems which rely on relative facial motion require high quality video cameras which may be affected by poor ambient light and do not work when the user remains very still. Another liveness detection measure is texture analysis which requires a large and diverse dataset to produce accurate results, often requires additional hardware, such as infrared cameras, and can be spoofed using photographs which contain little texture information. Finally, liveness detection measures which include analysing life signs such as blinking require additional hardware and may be intrusive to use by requiring users to perform specific gestures or motions at specific times.

Existing systems also have the problems of giving a high false alert rate, use algorithms which are CPU intensive, or require expensive hardware.

SUMMARY OF THE INVENTION

Embodiments of the invention seek to address the above problems by providing an image processing device comprising processing means configured to determine a first zone from an image associated with the user wherein the first zone is associated with one or more features characterising the user and wherein the first zone is associated with a first set of sample values; determine a second zone from a further image associated with the user wherein the second zone is associated with a second set of sample values wherein the location of at least some of the second set of sample values are different from the location of the first set of sample values; and to determine a characteristic value from the second zone or second set of sample values. Preferably, the characteristic value is determined based on a sample value or sample values associated with the second zone.

Embodiments of the invention may determine a first zone from an image associated with the user wherein the first zone is associated with one or more features characterising the user; determine a second detection zone from a further image associated with the user wherein the second detection zone is in close proximity to the first zone; and determine a characteristic value from the second detection zone. Usually, the second zone is different from the first zone.

Embodiments of the invention may provide a device for authenticating a user, the device comprising processing means configured to: determine, from an image associated with the user, a zone (701) adjacent to one or more features characterising the user; determine a characteristic value from the zone (701); and authenticate the user based on the determined characteristic value. Preferably, the processing means is further configured to subtract a background image from the image associated with the user.

Usually, the features characterising the user comprise features defining a user's body, head or face such as any one or more of a user's eyes, nose, mouth, ears, hair, and the like.

Preferably, the processing means is further compared to determine whether the image associated with the user is genuine based on the determined characteristic value. The second detection zone distance may be spaced from the first zone by a number of pixels. The two zones may be adjacent to or neighbour each other. Usually, the first zone encloses the one or more features characterising the user.

Thus embodiments of the invention may analyse a series of images to determine whether an image associated with a user is genuine or whether the image associated with the user is a deception, hoax or fake. This may be done by distinguishing between two dimensional images associated with a user and three dimensional images associated with the user.

Further, embodiments of the invention may analyse a series of images to determine whether an image associated with a user is 'live' or whether the image in fact relates to a "spoofing" attempt.

Accordingly, it will be appreciated that embodiments of the invention provide an effective solution to spoofing techniques using a printed face or a face displayed on a screen.

Further, embodiments of the invention have the advantages of a very fast answer time; a very low false alert rate; and a very good performance under variable lighting conditions. Further, embodiments of the invention have the advantage that they require no user interaction and may use relatively inexpensive hardware.

BRIEF DESCRIPTION OF THE DRAWINGS

An embodiment of the invention will now be described, by way of example only, and with reference to the accompanying drawings, in which:

FIG. 4 shows a set of user images and corresponding face locations for a genuine and a fraudulent user;

DETAILED DESCRIPTION

The following description is of a system for use in the aviation industry, but this is exemplary and other applications of the invention will also be discussed. For example, the system may be used in any environment where facial recognition technology may be implemented. Thus, embodiments of the invention find application in the security industry in general, as well as in other travel industries, such as rail, coach, car, and in border control in general.

Additionally, the following embodiments described may be implemented using a C++ programming language using for example an OpenCV library. However, this is exemplary and other programming languages known to the skilled person may be used such as JAVA, and .xml.

Figure 1:
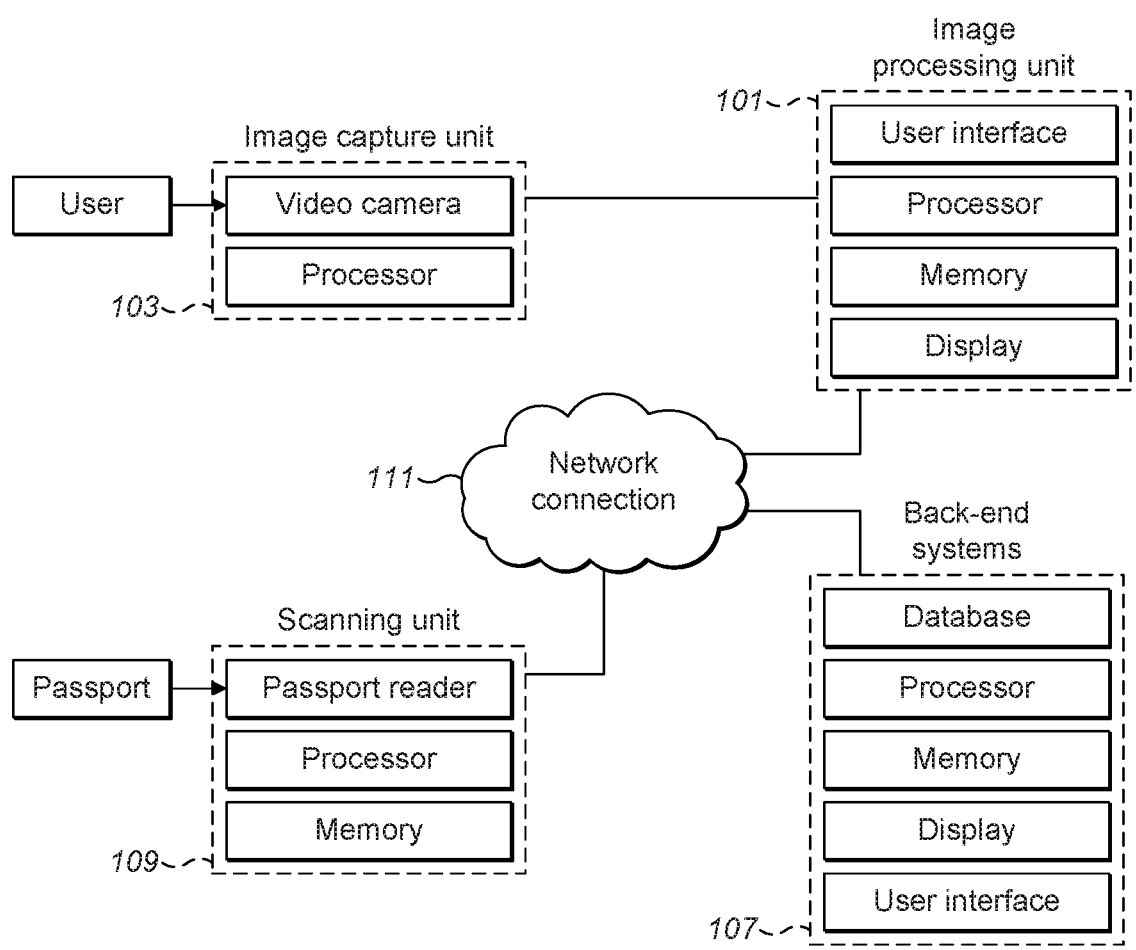
FIG. 1 is a schematic diagram of the main functional components embodying the invention.

Turning to FIG. 1, the system may comprise any one or more of an image capture unit 103 such as a video recording unit or video camera and an image processing unit 101.

The image capture unit 103 may be configured to capture an image or sequence of images. In one example, a camera, such as a digital camera, may be used to capture the image or sequence of images. Thus, the image capture unit 103 may be configured to capture a sequence of images as a video.

In a preferred embodiment, the image capture unit 103 comprises a video camera and a processor and is operable to capture live images of a user for use during facial recognition and liveness detection procedures. However, it will be appreciated that the system may also operate using previously stored images, whereby the image capture unit 103 further comprises a memory for storing images. The image capture unit 103 is communicatively coupled to the image processing unit 101 to enable images to be sent to the image processing unit 101 for analysis. The system is therefore applicable to both live image analysis and analysis of previously stored images.

The system may further comprise a scanning unit 109 and additional back-end systems 107 such as user verification units. The image processing unit 101, scanning unit 109 and back end systems 107 may be connected by a network connection 111.

The image processing unit 101 may be communicatively coupled, via wired or wireless transmission means which will be known to the skilled person, to any one or more different functional components, shown in FIG. 1 of the drawings.

The image capture unit 103 and image processing unit 101 may operate independently or form part of an applied border control gate (ABC gate) which may further comprise fingerprint scanners, smartcard readers, barcode readers and printers and so on.

The image processing unit 101 comprises a processor and usually any one or more of a user interface, a memory and a display. The image processing unit 101 receives images captured by the image capture unit 103 and uses stored algorithms further described below to analyse the images to determine whether an image associated with a user is genuine or fraudulent. The display may show the results of the analysis, or alternatively the results may be communicated with a separate back-end system 107.

In some embodiments, the system may include a scanning unit 109 which comprises a passport reader, a processor and a memory. The scanning unit 109 is operable to record a user's details such as their travel documents or biometrics. A scanning unit 109 may be included in the system where facial verification is analysed concurrently with liveness detection.

In some embodiments, the system may include back-end systems 107 which may comprise a database, a processor, a memory, a display and a user interface. The back-end systems 107 may provide access via an internet connection to flight departure systems, baggage handling systems, and face verification systems which provide the system with additional functionality.

In the following description, the term spoofing may refer to the process of an individual masquerading as another individual or concealing their identity, for example by hiding their face behind an image of a different user.

The term user image may be used to refer to an image of the user selected from a video stream while the user is in front of the image capture unit 103.

One or more background images may be recorded in a memory or stored in a buffer a few seconds before the user moves in front of the video camera's field of view. The object of the background images is to provide an estimation of the non-moving features located in the background of the user image. As the background image and user image are captured closely following one another, the background features which appear behind the user in the user image are substantially the same as the features of the background images.

The term foreground mask image may be used to refer to a modified version of the user image whereby the background has been removed from the user image using background subtraction. The foreground mask may show an estimation of the foreground objects in the user image.

The term face zone may be used to refer to a region of the user image or foreground mask identified by the image processing unit which contains the user's face.

The term ProcentFace may be used to refer to a parameter used to calculate the size of a detection zone from the face zone.

The term FaceDistance may be used to refer to a parameter used to calculate the displacement or position of a detection zone relative to the face zone.

The term decision threshold may be used to refer to a parameter used to calculate which decision (i.e. live or spoof) the system returns, based on a comparison between the score and the decision threshold.

For example a first threshold may be associated with a first set of parameters for detecting a photo spoofing attempt.

For example a second threshold may be associated with a second set of parameters for detecting a screen spoofing attempt.

In one example, if any one or more of the first and second thresholds are exceeded, the algorithm determines that the image is not genuine and that it relates to a spoofing attempt.

An adapted user image may refer to an image in which the white balance or/and luminance of the entire user image has been adapted or adjusted in accordance with any lighting variations. This may be done so that a small subsection of an image, and hence the background as a whole, match the lighting conditions of the background image.

System Operation

Figure 2:
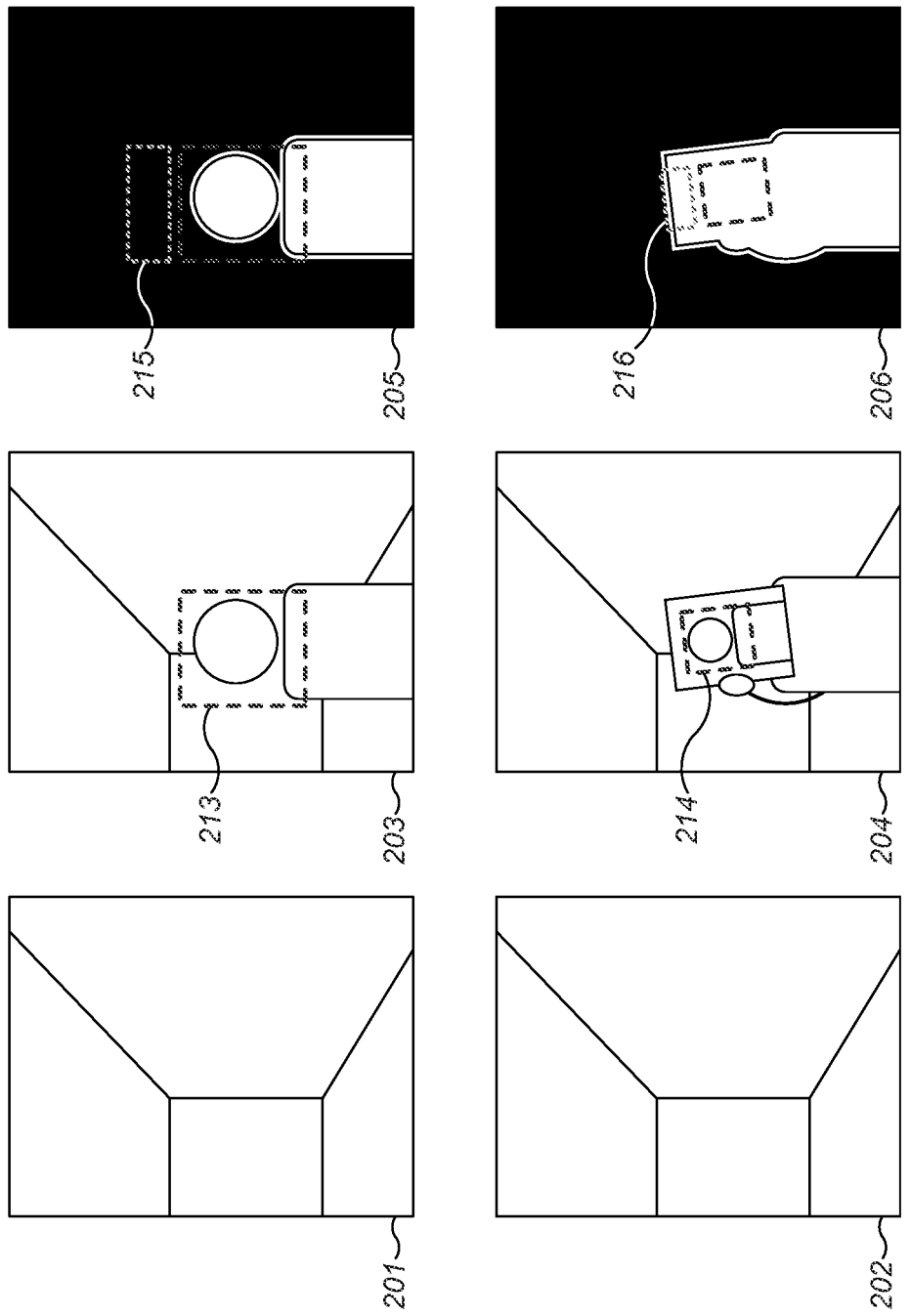
FIG. 2 shows a sequence of simplified images and how an embodiment of the invention processes these images.

FIG. 2 shows a simplified overview of exemplary images which may be used by embodiments of the invention for detecting a genuine user or a spoofing attempt. Images 201 and 202 represent background images, images 203 and 204 represent user images, and images 205 and 206 represent foreground mask images.

Images 201, 203, 205 show representations of images used by the system when analysing a genuine user, while images 202, 204, 206 show representations of images used by the system when analysing a spoofing attempt. In preferred embodiments, 8-bit images are used during analysis.

For both spoofing and 'live' cases, a background image 201, 202 is captured as well as a user image 203, 204. The background and user images are sent to the image processing unit 101 which determines that the image includes one or more features which characterises a user, such as their face. Further, the image processing algorithm may locate the position of the user's face within the image and identify a face zone 213, 214 associated with, or located on the user image, at step 1101.

The image processing algorithm then determines a foreground mask 205, 206 by subtracting the background image 201, 202 from the user image 203, 204. The image processing algorithm then maps the identified face zone 213, 214 to the foreground mask. The algorithm then extrapolates a detection zone 215, 216 from the face zone location, at step 1103. The detailed selection of the particular detection zone 215, 216 is described in further detail below.

The image processing unit then analyses the pixels within the detection zone to evaluate an average pixel value within the detection zone. Evaluating an average detection zone pixel value enables the algorithm to assess whether a user is attempting to spoof the facial recognition system. The image processing unit usually determines an average brightness, at step 1105, by performing a sum of pixel brightness values of pixels associated or within the determined detection zone and dividing the sum by the number of pixels associated with or within the detection zone.

A further embodiment of the invention will now be described referring to FIGS. 3 to 10 of the drawings. FIGS. 3 to 7 may be colour images, but for the sake of clarity, these are shown as line drawings in these figures. For example, the digital images may be defined according to the well-known JPEG format, but any image format may be used. For example, the images may comprise sample values or pixels according to an RGB colour model or YCbCr model with Luma values (Y), and Chroma values each Chroma value having Cb and a Cr component.

In this embodiment, background images are captured by the image capture unit 103 before the user enters a user processing area.

Figure 3:
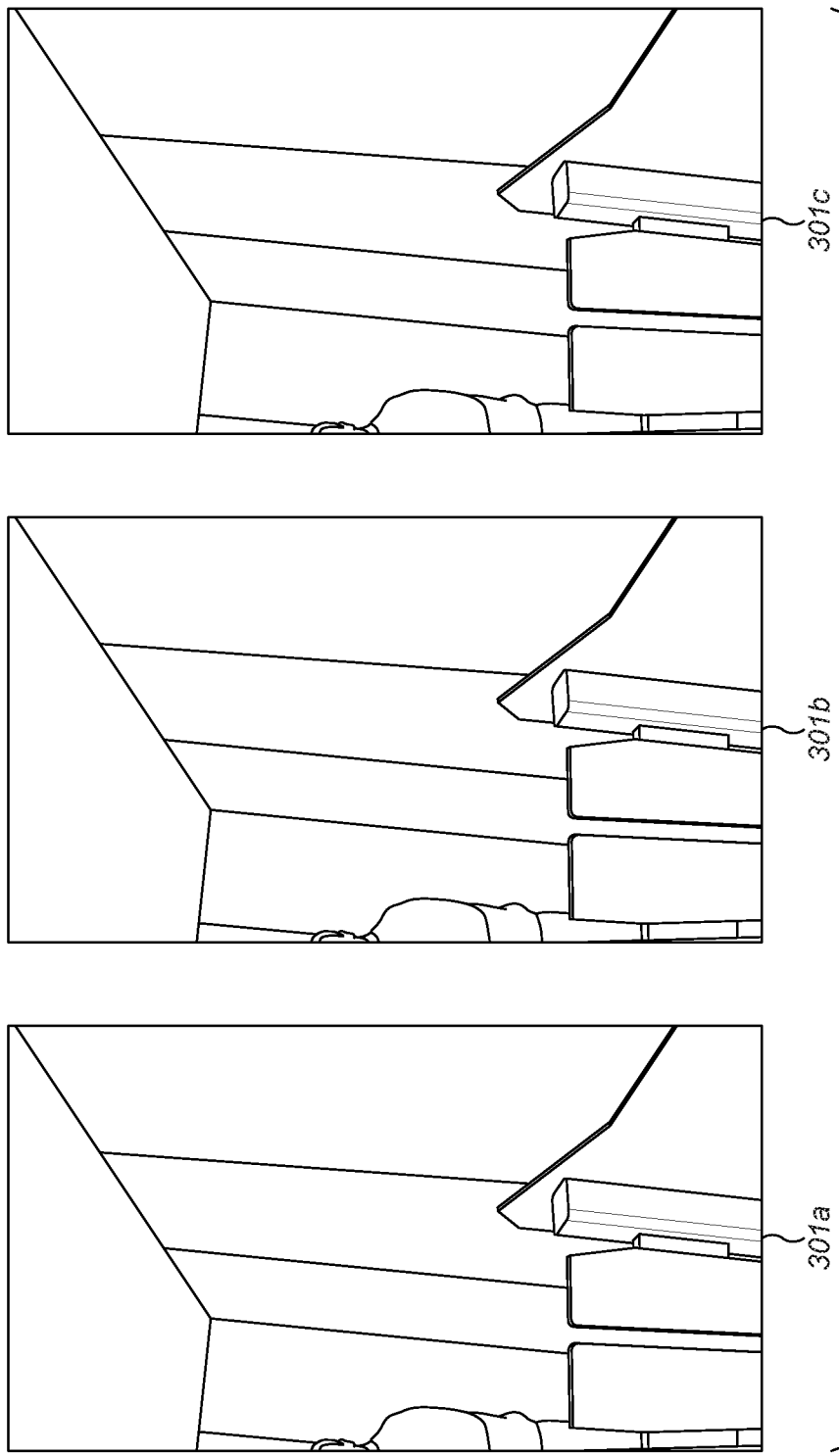
FIG. 3 shows a set of images depicting the background without a user present.

FIG. 3 shows examples of background images 301. In the background images 301 shown the user has not yet fully appeared into the camera's field of view. Once captured, the images are transferred from the image capture unit 103 to the image processing unit 101. Three different images 301a, 301b, and 301c may be used to calculate a model image of the background. The model image may be used as the background image. Alternatively, any one of the images 301a, 301b, and 301c may be selected as the background image.

The system may capture the background images 301 using a trigger mechanism or device. The trigger device may be communicatively coupled to the image processing means or/and image capture unit. Accordingly, the image processing algorithm may be executed in response to detecting a user using the trigger mechanism.

Examples of trigger mechanisms can include an infrared detector, detecting a user scanning their passport, or detecting the last user departing the user processing area. Each of these trigger events occurs before the user appears in the camera's field of view. The camera therefore is able to record the background features without the user being present. Alternatively, a video camera may capture a continuous video stream whereby the image processing unit 101 identifies relevant portions of the video stream to be analysed. The images used by the system may be in any format. In some embodiments, the images captured by the video camera are JPEG format.

It is important that the foreground mask, which shows a foreground estimation, substantially represents the user and contains no background features. There is usually little variation between the background features of the background image and the user image. If this is not the case then there is an increased likelihood the algorithm will erroneously detect a spoofing attempt leading to an increase in false alert rate.

The false alert rate may be reduced by removing moving objects in the background. Often in busy environments the video recording of the background will include moving objects, such as people or vehicles passing by. However, static background features, such as building infrastructure, furniture, plants, etc. do not move and will also be present in the background of the user image.

Therefore in some embodiments, where the background contains many moving objects, the image processing unit 101 can analyse the video recording to digitally remove moving features in order to create an estimation of the background features. Alternatively, identified static background features from multiple frames of the video recording may be collated into a single background image.

In an alternative embodiment, where it is known there will be few moving object in the background, the image processing unit 101 may select one or more frames from a video stream to determine the background features. This has the benefit of requiring less computation than analysing the entire video stream.

Once the background has been estimated using the background images 301, the image capture unit 103 captures a user image. Examples of user images are shown in FIG. 4.

In a first example, a 'live' user enters the user processing area and an image 401 is recorded or buffered with the user in the foreground. In a second example, an image 402 is recorded or buffered of a user attempting to spoof the facial recognition system.

Where the user is recorded using a video camera, the most suitable frame for analysis can be selected by an algorithm. For example, frames where the user is not blinking or turned away from the camera would be suitable for analysis. Frames can also be selected once a face matching algorithm confirms the identity of the user.

The user images 401, 402 captured by the image capture unit 103 are passed to the image processing unit 101, which analyses the user image to detect or/and locate the position of the user's face within the image. Face location may be performed using known face-locating techniques such as a face location algorithm capable of detecting facial features such as the eyes and nose. Once the face has been located, the image processing unit identifies a face zone 403 on the user image 401, at step 1101. This may be implemented using OpenCV and open source algorithms.

In a preferred embodiment, face detection is performed using a Haar Cascade method which uses a classifier trained to recognise Haar-like features within an image. One specific example of a Haar Cascade algorithm is cv2.CascadeClassifier('haarcascade_frontalface_default.xml'). This algorithm may be found at http://docs.opencv.org/trunk/d7/d8b/tutorial_py_face_detection.html. The Haar-like features comprise edge features, line features, diagonal line features and centre features.

The classifier is trained to identify a particular object, for example a face, using a large number of positive samples showing the object to be recognised and negative samples showing arbitrary images without the object.

During subsequent analysis of an image, the classifier identifies each Haar-like feature present in the image in separate stages. A first stage labels a specific region of the image as being either positive, i.e. containing a first Haar-like feature, or negative. If a region of the image is labelled positively, the region is further analysed by the next stage in a cascading manner. If each stage labels a region positively the classifier identifies the region as containing the object.

Pixel coordinate systems are normally defined as a Cartesian coordinate system with the origin at the top left corner of an image or screen. A specific pixel location (x,y) defines the location from the origin as x pixels to the right of the origin and y pixels below the origin.

In other pixel coordinate systems, the origin may be located at the bottom left corner of an image or screen. A specific pixel location (x,y) would in that case define the location from the origin as x pixels to the right of the origin and y pixels above the origin.

Usually, the detected feature is enclosed by a rectangular zone, which may be referred to as a face zone, defined by a width and height. Thus, the algorithm determines a first zone from the image associated with the user, and usually, the first zone (403) encloses one or more features identified by the algorithm.

Figure 7:
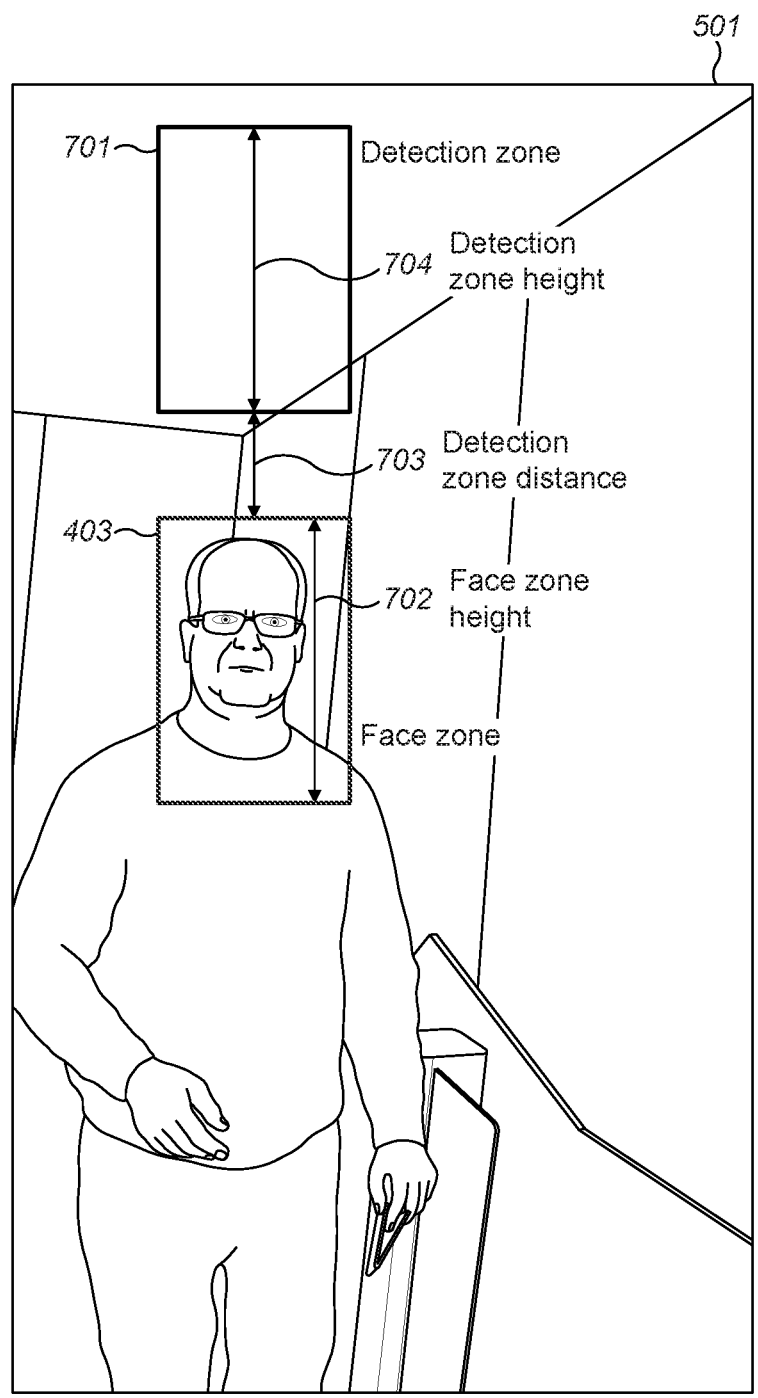
FIG. 7 is user image with a face zone, a detection zone and characteristics of each zone identified.

In one embodiment, the algorithm defines the rectangular zone by returning the coordinates of the top left and bottom right corners of the zone 403 shown in FIG. 7. In other embodiments, the algorithm defines the rectangular zone by returning the coordinates of the top left corner of the zone along with a zone height and a zone width. Usually, the width of the first zone corresponds to, or matches the width of a detection zone.

Other methods of facial detection are available which also identify a zone containing a set of recognised features. For example, in an alternative embodiment, the software development kit NexaFace™ Facial Recognition Software may be used to identify a zone containing a set of facial features.

In one embodiment, the facial detection algorithm identifies the location of a zone by returning the coordinates corresponding to the top left and bottom right corners of a region containing facial features. The zone is represented by a rectangle defined by the coordinates returned by the algorithm. In other embodiments, the zone is represented by a rectangle defined by the pixel coordinates of a particular corner of the zone, a number of pixels corresponding to the zone width and a number of pixels corresponding to the zone height.

The zone is used in embodiments of the invention to define a user face zone 403, a detection zone 701, and parameters of the rectangular border define the face height parameter as further described below.

Figure 5:
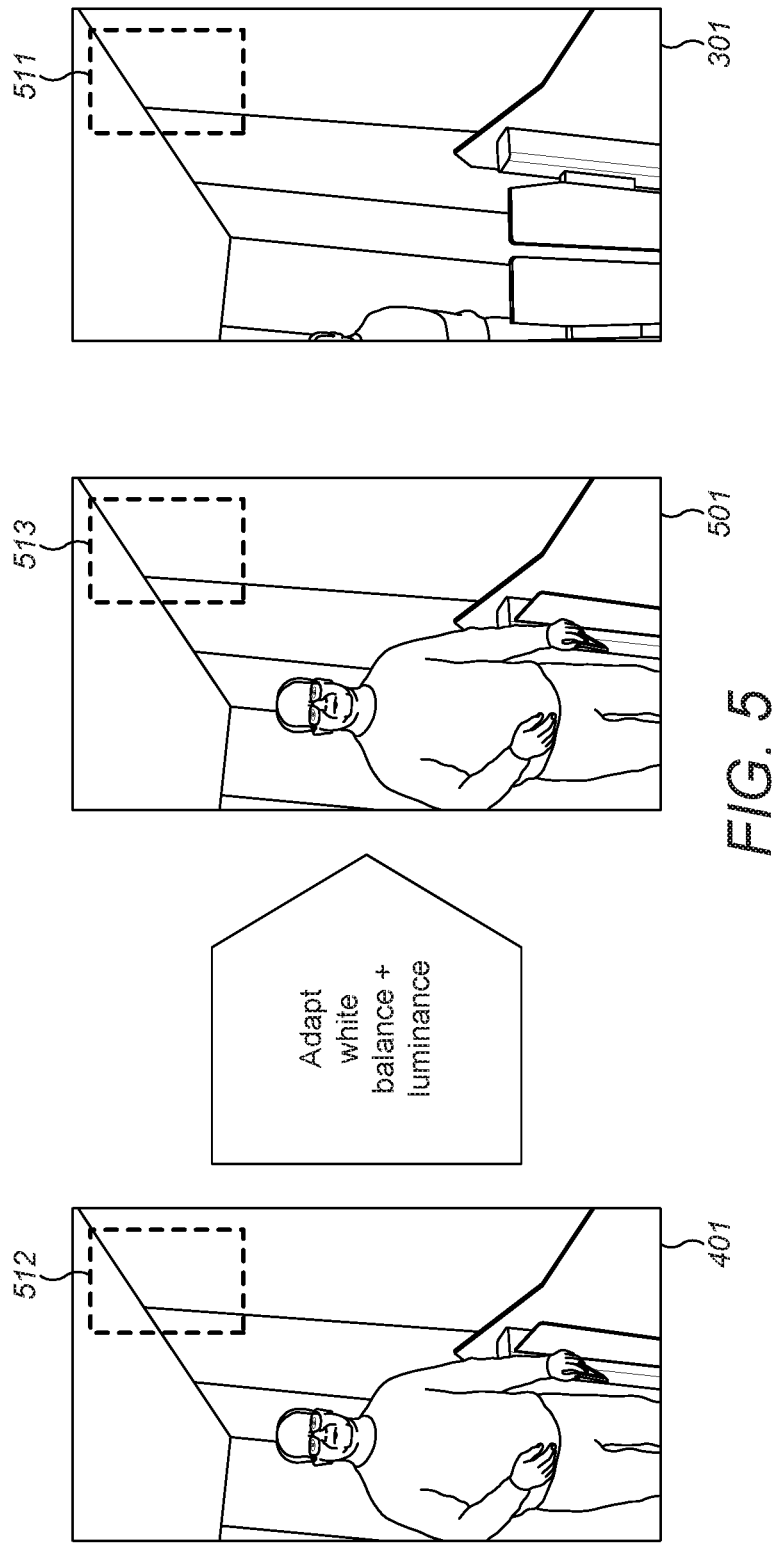
FIG. 5 shows a user image and how this image may be adjusted so that the white balance and luminance to match a background image.

FIG. 5 shows a schematic representation of how user image characteristics may be adapted to match characteristics of a background image.

This may be needed because the background of the user image 401 may not match the background image 301 as the camera may automatically adjust the gain control or white balance between recording the background images 301 and the user image 401. To overcome this problem, the image processing unit 101 adapts characteristics of the user image to correct any lighting variations between the user image 401 and the background images 301.

The use of an adapted user image may allow for a foreground mask to be produced which is an accurate representation of the foreground objects. This means that the system false alert rate is reduced.

As shown in FIG. 5, the image processing 101 unit determines the lighting conditions of the background image 301 by analysing a small subsection 511 of the background image. The location of the background image subsection 511 should be selected so that it will not usually include the user. The background subsection should therefore also be identifiable in the user image 512. A suitable example may be a small rectangular region 511, 512, 513 of the upper right corner of the images shown in FIG. 5.

Next, the image processing unit 101 compares the lighting conditions between the background subsection 511 and the user image subsection 512 and calculates the relative lighting variations between the images. If there are any differences, the image processing unit 101 creates an adapted user image 501 by adjusting luminance of the entire user image 401 in accordance with the lighting variance so that the small subsection 513, and hence the background as a whole, match the lighting conditions of the background image 301.

Thus, it will be appreciated that the image processing algorithm may compare pixel luminance values of corresponding pixels in similar or the same location in boxes 511, and 513, and determine the difference between the luminance values associated with these pixels. The algorithm may further modify the pixel luminance value of all pixels in image 501 based on the determined difference, so that they match or have substantially equal values.

Similarly, an optional Auto White Balance correction operation may be performed on any of the images. The white balance operation may be performed on an entire image and is not usually correlated with other images. Thus, the same white balance algorithm may be performed on two pictures or images. This means that after the Auto White Balance correction algorithm has been performed on an image, the white balance associated with two different images should substantially match or be close even if the camera which captured the image has changed its white balance settings after one image has been captured, but before the subsequent image has been captured.

Producing an adapted user image 501 has the advantage of allowing the system to operate reliably and accurately in a range of different lighting conditions and counteracts any automatic gain control or white balance the video camera may perform in operation. Thus, one or more values or parameters associated with the adapted user image 401 may substantially match the values or parameters associated with the background image 301.

Figure 6:
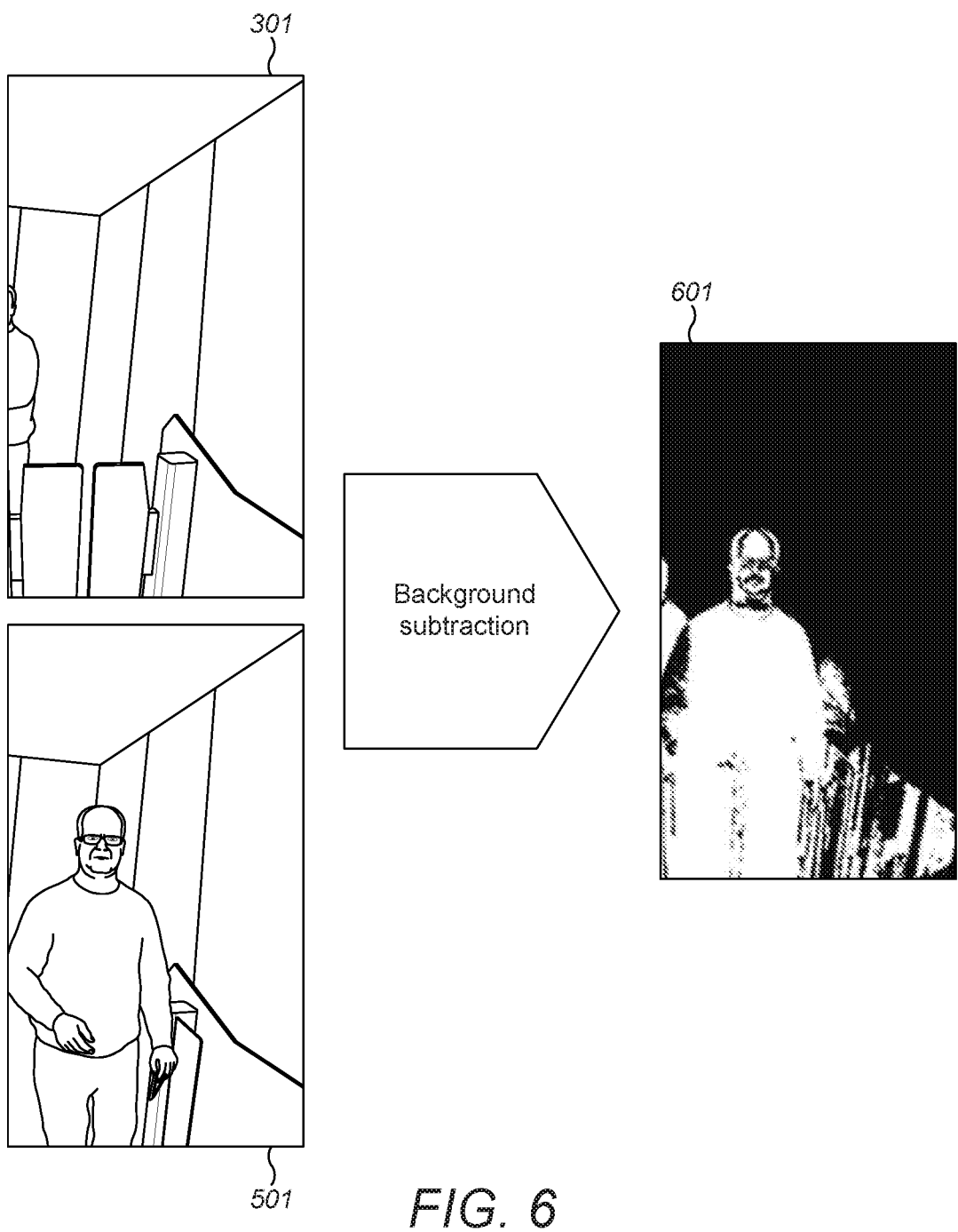
FIG. 6 shows a foreground mask image resulting from background subtraction.

FIG. 6 shows an example of a foreground mask image 601. A background subtraction algorithm may be used to produce an estimation of the user image foreground as a black and white image by performing a pixel-by-pixel subtraction between a selected frame image and a background image or background model image.

In some embodiments, algorithms for performing background subtraction may include Gaussian Mixture-based background/foreground segmentation algorithm which will be known to the skilled person. For example, an algorithm such as cv::BackgroundSubtractorMOG2 may be used. This algorithm may be found at http://docs.opencv.org/trunk/d7/d7b/classcv_1_1BackgroundSubtractorMOG2.html. The algorithm may perform background subtraction based on a Gaussian weighted mixture of background and segments or pixels associated with the user image. This results in the foreground mask image which is produced using the background image (or the background model image) and the user image.

If the algorithm determines that a particular pixel in the user image is well described by the background image, then the algorithm marks a corresponding pixel in the foreground mask image as a black pixel with a value of 0. If the algorithm determines that a particular pixel is not well described by the background image, then the corresponding pixel in the foreground mask image is marked as a white pixel with a fixed non-zero value.

Thus, the foreground mask image 601 is usually a black and white image with black pixels having an associated intensity value of 0. The black pixels may represent or be associated with the subtracted background and the white pixels may represent or be associated with features in the image foreground. The white pixels may have an associated non-zero value. For example, in one embodiment the white pixels have a value of 255. Alternatively, white pixels may be represented by a value of 1.

Advantages of analysing the pixel values of the foreground mask 601 include providing an effective way of determining whether a user is attempting to spoof the facial recognition software.

With reference again to FIG. 2, spoofing attempts which make use of a photograph on a mobile device or passport photograph will usually have a border between the edge of the photographed face and the background. When the foreground mask 205, 206 is created, a live user and a spoofing attempt create different foreground estimations due to the presence of a border in the spoofing image. Calculating how much of a foreground border exists between the edge of the user's face and the background in the foreground mask 205, 206 may be performed using a detection zone 215, 216 in close proximity to the face zone 213, 214 as further described below.

With reference now to FIG. 7, the image processing unit 101 extrapolates the location of the detection zone 701 from the known face zone 403 location, at step 1103. The previously determined face zone 403 location may be mapped onto either the adapted user image 501, as shown in FIG. 7, or onto the foreground mask 601. The face zone 403 located on the user image 401 may be mapped directly to the corresponding pixels of the foreground mask using any pixel coordinate system.

FIG. 7 shows the face zone 403 and detection zone 701 as well as the detection zone height and detection zone distance used by a particular exemplary algorithm. With this algorithm, the distance from the face zone 403 to the detection zone 701 may be calculated by Detection Zone Distance=Face Height*FaceDistance and the size of the detection zone is calculated by Detection Zone Height=Face Height*ProcentFace. Face Distance and ProcentFace are adjustable parameters which determine the distance from the face zone to the detection zone and the detection zone height respectively. Usually, the width of the detection zone corresponds to the width of the face zone.

Face Height 702 is defined as the height of the face zone in pixels. In embodiments using a 5 MP camera, the height of the face zone may be between 300 to 400 pixels in size. The Detection Zone Distance 703 is defined as the distance from the top of the face zone to the bottom of the detection zone. The Detection Zone Distance 703 is calculated by multiplying the height of the face zone, Face Height 702, by parameter FaceDistance. If FaceDistance has a value of zero, then there is no separation between the bottom of the detection zone and the top of the face zone. If FaceDistance has a non-zero value, the detection zone will be separated by a multiple of the Face Height, as shown in FIG. 7. A positive FaceDistance value enables the algorithm to ignore hats or other objects which may be located on the user's head.

Although not shown in FIG. 7, FaceDistance may have a negative value, in which case the detection zone and the face zone will overlap. A negative FaceDistance value is preferable in embodiments where the face zone returned by the face detection algorithm is very large.

The FaceDistance parameter value is preferably in the range from −0.2 to 2. Parameter values below this range may result in too great an overlap between the face zone and detection zone. If this occurs, the detection zone may include parts of the user's face resulting in a higher false alert rate. Parameter values greater than the above range result in the detection zone being too far away from the user image. This can result in the detection zone no longer falling within the adapted user image 501. Again, this results in a higher false alert rate.

Detection Zone Height 704 is defined as the height of the detection zone in pixels. The Detection Zone Height 704 is calculated by multiplying the height of the face zone, Face Height 702, by parameter ProcentFace. The Detection Zone Height 704 is therefore directly proportional to Face Height 702.

For the detection zone to exist, the ProcentFace parameter must have a positive non-zero value. Preferably, the ProcentFace value is less than 2.

Parameter values are evaluated by calculating the false alert rate for many different parameter values during use by live, i.e. non-spoofing, users. By selecting an optimal set of parameter values which yield an acceptable outcome, a working set of parameters may be evaluated which successfully detect spoofing attempts with an acceptable rate of accuracy.

Table 1 below shows an example set of parameter values and their corresponding false alert and detection rates for a particular data set. Table 1 shows the effect adjusting the threshold value has on the system false alert rate and detection rate. Table 1 also shows that different spoofing techniques are associated with different optimal parameter values. In one embodiment, the algorithm uses both parameter values in parallel calculations to determine if either set of parameters result in a detected spoofing attempt.

TABLE 1

Exemplary values of the FaceDistance parameter and ProcentFace parameter along with associated thresholds, false alert rates and detection rates for two different parameter settings.

|  | FaceDistance parameter | ProcentFace parameter | Threshold | False Alert rate | Detection Rate |
|---|---|---|---|---|---|
| Screen & photo settings | 0.3 | 0.6 | 77 | 0.47% | 90% |
|  | 0.3 | 0.6 | 49 | 0.88% | 100% |
| Passport settings | 0.9 | 1.9 | 154 | 0.67% | 72% |
|  | 0.9 | 1.9 | 136 | 0.99% | 82% |

The specific values shown in the table minimize a false alert rate whilst providing an acceptable detection rate in a production environment.

Usually, the FaceDistance and ProcentFace values or parameters are fixed parameters. Usually, the Face Height parameter is determined by the face detection algorithm previously described.

In the above description, the zone parameters and algorithm thresholds may be optimised by minimising the system's false alert rate and maximizing the detection rate. The parameters and thresholds may then be tested using a large number of calculations performed on a large dataset of faces.

The parameter and threshold settings define the geometry of the detection zone and the sensitivity to change within the detection zone respectively.

Spoofing techniques involving a screen or a passport image may require different optimum zone parameter and threshold settings to ensure a correct detection rate while maintaining sufficiently low false alert rate. For example, the detection rate and false alert rate for screen spoofing attempts are optimum when the detection zone is located in close proximity to the face zone. By contrast, the detection rate and false alert rate for the passport spoofing attempts are optimum when the detection zone is located further from the face zone but had increased sensitivity.

Therefore, for a single spoofing attempt, the image processing unit may analyse the foreground mask twice using the optimum settings for detecting screen spoofing as well as the optimum settings for passport spoofing. These calculations may be run in parallel and if spoofing is detected for either calculation in the manner described above then the image processing unit determines that a spoofing attempt has been made.

Using a combination of tests for each spoofing technique, a false alert rate of 1% may be achieved while having a 90% detection rate for a spoofing attempt using a passport photo and 80% detection rate for a spoofing attempt using an image on a screen.

Other algorithms may be used to extrapolate the detection zone, and may include measures to allow the system to be invariant to head orientation and to locate items such as hair and hats located above the user's face.

Thus, the detection zone 701 should usually be in close proximity to the face zone and is preferably located just above the face zone. However, the method of the claimed invention would be equally viable if the detection zone 701 was located proximal to either side of the head.

Figure 8:
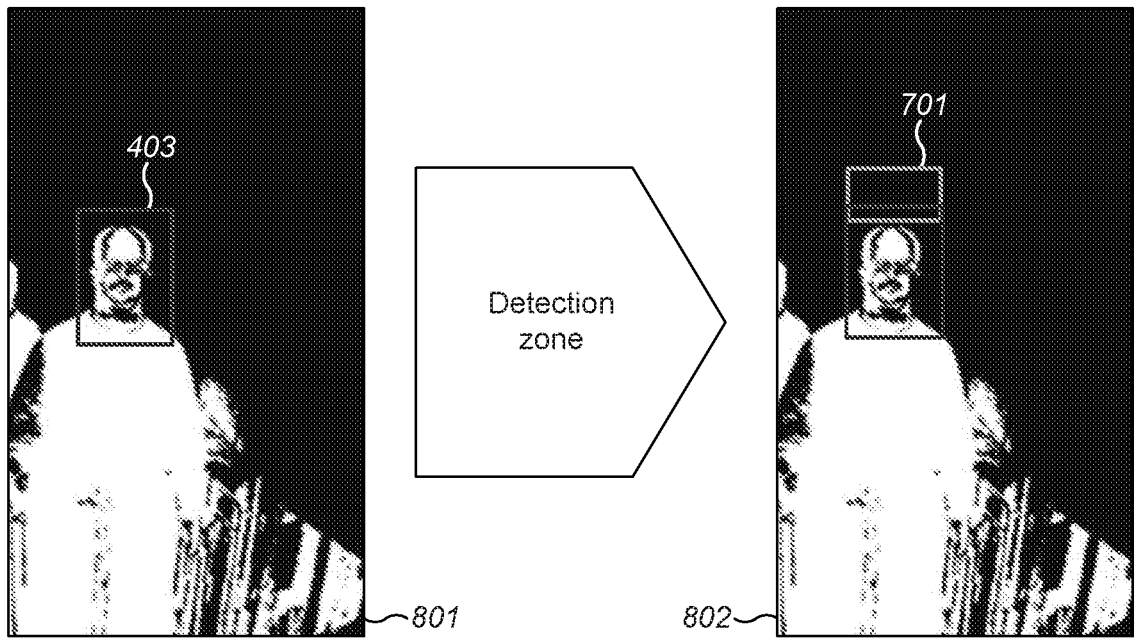
FIG. 8 shows a foreground mask image with the face zone and detection zone identified.

FIG. 8 shows the face zone 403 mapped onto a foreground mask 801. The image processing unit 101 extrapolates the detection zone 701 from the face zone 403 in image 802 and performs a liveness evaluation over the pixels within the detection zone 701.

The liveness evaluation or determination of whether the user image is genuine may be performed by calculating a characteristic value, at step 1105 from the detection zone 701 to yield a score. In FIG. 8, the score following analysis of the foreground mask is 0. In preferred embodiments the characteristic value is the average pixel value. Hence, if a black pixel has a value of 0 and a white pixel has a value of 255, the average pixel value will be between 0 and 255. This characteristic value may be plotted on a greyscale and compared against a threshold value as further described below.

The characteristic value may be an average pixel brightness for the pixels within the detection zone 701. In another alternative, the characteristic value is the proportion of pixels within the detection zone 701 which are white. Other characteristic values indicative of the prevalence of pixels indicating foreground objects may also be used. The image processing unit 101 compares the score to a threshold value and evaluates whether the detected face is live or not based on the comparison.

As indicated above, the background of the foreground mask will be substantially represented by black pixels and the presence of foreground objects will be substantially represented by white pixels. The presence of foreground objects outside the detected face and within the proximal detection zone is strongly suggestive of a border region and hence a non-live detected face. In other words, a higher score is indicative of a larger number of white pixels which in turn is due to the presence of a foreground object within the detection zone 701. For a spoofing event, a significant part of the border between the edge of the photographed face and the background will be detected, leading to a high score. The threshold value acts as a margin of error, and if the score equals or exceeds the threshold value then the system registers a spoofing attempt.

Figure 9:
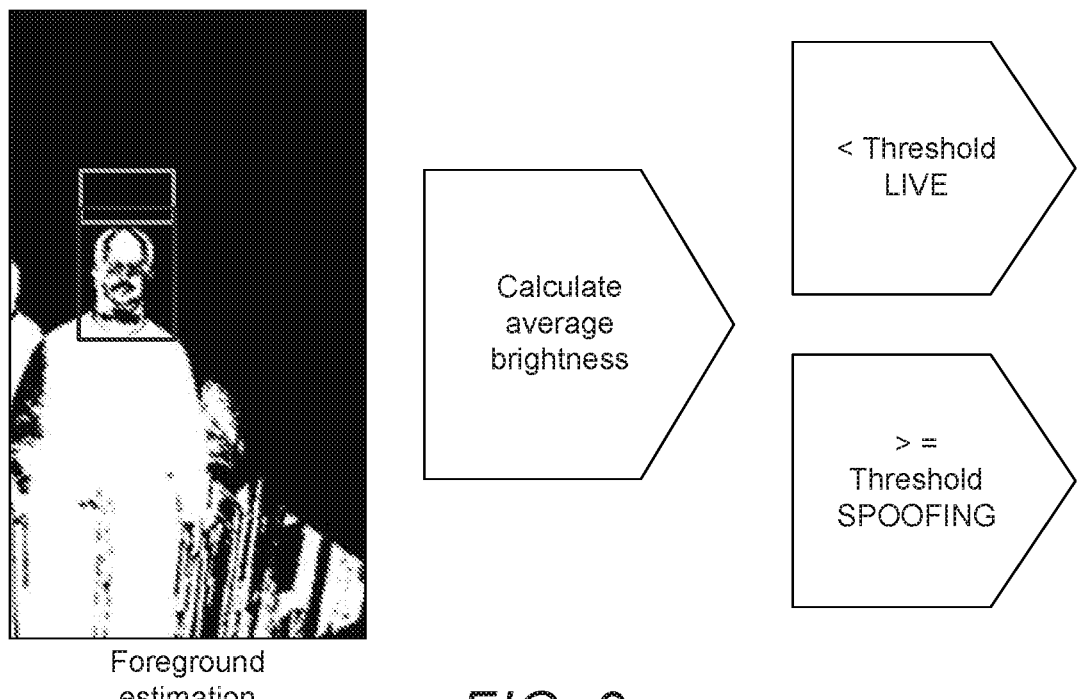
FIG. 9 shows a representation of the Boolean calculation for establishing whether the image is genuine or fraudulent.

The above process is represented in FIG. 9 where a Boolean evaluation of a calculated score determines the system response. For airport immigration applications, determining the passenger is 'live' allows the system to release the passenger from the processing area. However, if the system detects a spoofing attempt an alert is sent to a supervising immigration officer while retaining the user within a processing area. A moveable gate may be used to selectively retain a user within a particular area based on whether the image processing unit determines that the user image is genuine or not.

Figure 10:
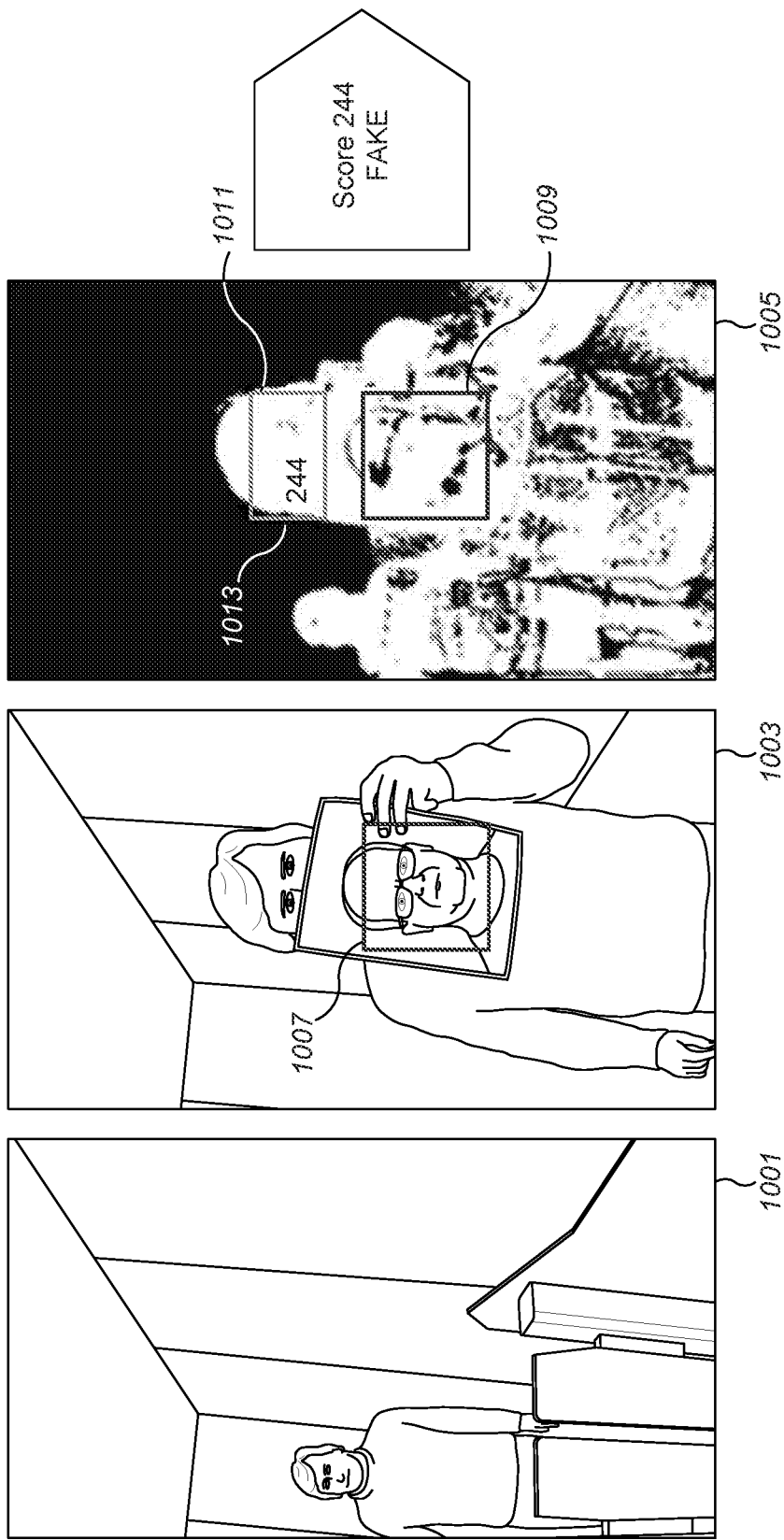
FIG. 10 shows a series of images depicting the process and results for a spoofing attempt.

FIG. 10 shows an example where the system detects a user attempting to spoof the system using a printed picture of a different face.

In accordance with the above description, background images 1001 and user images 1003 are captured by the image capture unit 103 and transmitted to the image processing unit 101. The image processing unit 101 identifies a face zone on the user image 1007. The image processing unit 101 performs lighting adaptation and background subtraction on the user image 1003 to produce a foreground mask 1005. The face zone 1007 is mapped onto the foreground mask 1005 by the image processing unit 101 and the position of the detection zone 1011 is extrapolated from the mapped face zone 1009, as described above.

In the example shown in FIG. 10, the printed picture contains a border region between the face and the background. A significant part of the border region and other foreground features, such as the user's partially concealed head, fall within the detection zone 1009. The presence of foreground features in the detection zone leads to a high calculated score 1013 of 244. As this score exceeds a predetermined threshold value, the system registers a spoofing attempt.

Figure 11:
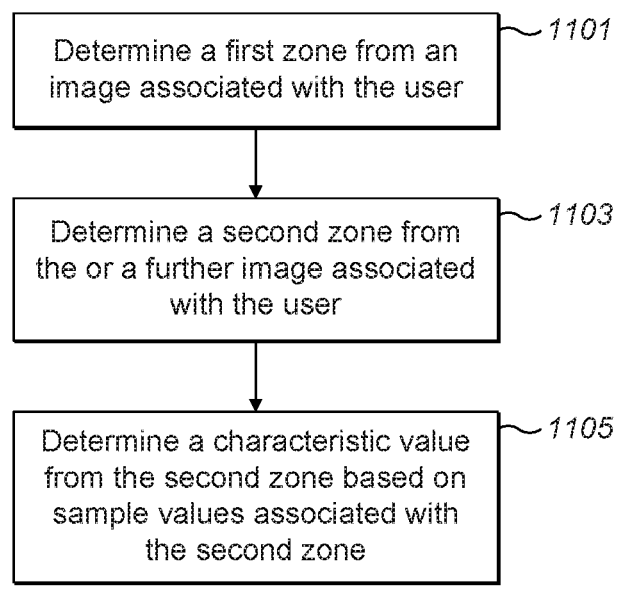
FIG. 11 is a flow diagram showing the steps performed by an embodiment of the invention.

The flowchart of FIG. 11 illustrates the operation of an example implementation of systems, methods, and computer program products according to various embodiments of the present invention. Each block in the flowchart or block diagrams may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

Embodiments of the invention may also handle images where the user's head is incorrectly orientated, or where the user is short in height, and features in the background changing.

For example, if the user looks down, their incorrect head orientation can result in parts of the user's head or hair being present in the detection zone. This results in a much higher liveness evaluation score than if the face were correctly orientated and can lead to a false alert. In this situation, the detection zone can be extrapolated to a different location based on knowledge of the user's head rotation. A user's head rotation may be calculated by the face location algorithm which establishes the pitch yaw and roll of the face. If head rotation is detected then the detection zone may be placed to the side of the user's head, for example.

If a user is too short, the detection zone may be positioned so that it detects background movement behind the user, for example other queuing users, leading to a false alert. In this situation, a second video camera may be located below the first camera to change the perspective of the recorded images. Additionally, the use of a wide angle camera enables the accurate detection of tall and small users. For example, wide angle cameras enable the successful detection of users between 1.4 m and 2.1 m in height.

Finally, some features in the background may change. For example, advertising panels in the background may be illuminated at sporadic intervals which may have an effect on the system's effectiveness. Where this occurs, an excluded zone may be established within the detection zone which prevents the change in background affecting the computations performed by the algorithm.

Features of the above invention may be implemented as part of airport identification systems. Such systems may include self-service check-in kiosks or immigration gates.

From the foregoing, it will be appreciated that the image processing device may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C #, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. An image processing device comprising a memory and at least one processor, the at least one processor configured to:
  i. determine a first zone from an image associated with a user wherein the first zone is associated with one or more features characterizing the user, wherein the first zone is associated with a first set of sample values;

ii. determine a second zone from a further image associated with the user wherein the second zone is associated with a second set of sample values wherein a location of at least some of the second set of sample values are different from a location of the first set of sample values;

iii. determine a characteristic value from the second zone, wherein the characteristic value is an average of the second set of sample values; and iv. determine the user is genuine only if the determined characteristic value is less than a predetermined threshold.

2. The image processing device according to claim 1, wherein the second zone is proximal to the first zone and wherein the second zone does not include the one or more features characterizing the user.

3. The image processing device according to claim 1, wherein the second zone is adjacent to the first zone.

4. The image processing device according to claim 1, wherein the location of the first set of sample values is different from the location of the second set of sample values.

5. The image processing device according to claim 1, wherein the first zone encloses at least one of the one or more features characterizing the user.

6. The image processing device according to claim 1, further comprising determining a foreground image from the image associated with the user.

7. The image processing device according to claim 6, wherein the foreground image is a foreground mask image determined based on a Gaussian weighted mixture of a background image and the image associated with the user.

8. The image processing device according to claim 1, further comprising determining the characteristic value based on one or more values of the second set of sample values.

9. The image processing device according to claim 1, further comprising:
  comparing sample values associated with a background image with corresponding sample values associated with the image associated with the user; and
  adjusting the sample values of the image associated with the user so that the sample values match those associated with the background image.

10. The image processing device according to claim 1, further comprising correcting at least one of: white balance values and luminance values associated with the image.

11. The image processing device according to claim 1, wherein the image processing device is further configured to associate the first zone with the image associated with the user based on a mapping of pixel coordinates.

12. The image processing device according to claim 1, wherein the image processing device is further configured to associate the second zone with the image associated with the user based on a mapping of pixel coordinates.

13. The image processing device according to claim 1, wherein the first zone is spaced from the second zone by a detection zone distance wherein the detection zone distance is defined as a predetermined number of horizontal or vertical pixels away from the first zone.

14. The image processing device according to claim 1, wherein the image processing device is further configured to determine a detection zone distance based on a parameter defining a height of a feature associated with the user.

15. The image processing device according to claim 1, wherein a ratio of a detection zone distance and a parameter defining a height of a feature associated with the user is in a range of at least one of: −0.2 to 0.9 inclusive, greater than or equal to zero, and 0.3 to 0.9 inclusive.

16. The image processing device according to claim 1, wherein the second zone is defined by a detection zone height parameter.

17. The image processing device according to claim 1, wherein a detection zone height parameter is determined based on a further parameter defining a height of a feature associated with the user, wherein a ratio of a detection zone height and a parameter defining the height of a feature associated with the user is in a range of 0.6 to 1.9 inclusive.

18. The image processing device according to claim 1, wherein the first zone and the second zone are each substantially rectangular in shape.

19. The image processing device according to claim 1, wherein the processor is further configured to determine a foreground mask image from the second zone.

20. The image processing device according to claim 1, wherein the processor is further configured to determine one or more features characterizing the user from the image associated with the user and a location of the features within the image.

21. An image processing method comprising the steps of:
  determining a first zone from an image associated with a user, wherein the first zone is associated with one or more features characterizing the user, wherein the first zone is associated with a first set of sample values;
  determining a second zone from a further image associated with the user wherein the second zone is associated with a second set of sample values wherein a location of at least some of the second set of sample values are different from a location of the first set of sample values;
  determining a characteristic value from the second zone, wherein the characteristic value is an average of the second set of sample values; and
  determining the user is genuine only if the determined characteristic value is less than a predetermined threshold.

22. The image processing method according to claim 21, wherein a ratio of a detection zone distance and a parameter defining a height of a feature associated with the user is in a range of at least one of: −0.2 to 0.9 inclusive, greater than or equal to zero, and 0.3 to 0.9 inclusive.

23. A device for authenticating a user, the device comprising a memory and at least one processor, the at least one processor configured to:
  i. determine, from an image associated with the user, a zone adjacent to one or more features characterizing the user;
  ii. determine a characteristic value from the zone, wherein the characteristic value is an average of a set of sample values associated with the zone;
  iii. determine the user is genuine only if the determined characteristic value is less than a predetermined threshold; and
  iv. authenticate the user based on the determined characteristic value and determining that the user is genuine.

24. The device according to claim 23, wherein a ratio of a detection zone distance and a parameter defining a height of a feature associated with the user is in a range of at least one of: −0.2 to 0.9 inclusive, greater than or equal to zero, and 0.3 to 0.9 inclusive.

25. The device according to claim 23, wherein a detection zone height parameter is determined based on a further parameter defining a height of a feature associated with the user, wherein a ratio of a detection zone height and a parameter defining the height of a feature associated with the user is in a range of 0.6 to 1.9 inclusive.

* * * * *